US010560461B1

(12) United States Patent
Desikan et al.

(10) Patent No.: US 10,560,461 B1
(45) Date of Patent: *Feb. 11, 2020

(54) AUTOMATIC GROUP ASSIGNMENT OF USERS IN A SOCIAL NETWORK

(71) Applicant: Google Inc., Mountain View, CA (US)

(72) Inventors: Pavan Desikan, Palo Alto, CA (US); Jean-Christophe E. Lilot, Mountain View, CA (US); Dennis Troper, Los Altos, CA (US); Gregory M. Marra, San Francisco, CA (US); Abhishek Sethi, Milpitas, CA (US); David M. Byttow, San Francisco, CA (US)

(73) Assignee: Google LLC, Mountain View, CA (US)

(*) Notice: Subject to any disclaimer, the term of this patent is extended or adjusted under 35 U.S.C. 154(b) by 67 days.

This patent is subject to a terminal disclaimer.

(21) Appl. No.: 15/284,398

(22) Filed: Oct. 3, 2016

Related U.S. Application Data

(63) Continuation of application No. 13/667,825, filed on Nov. 2, 2012, now Pat. No. 9,462,004.

(60) Provisional application No. 61/556,161, filed on Nov. 4, 2011.

(51) Int. Cl.
*H04L 29/06* (2006.01)
*H04L 12/58* (2006.01)
*H04L 29/08* (2006.01)
*G06Q 50/00* (2012.01)

(52) U.S. Cl.
CPC .......... *H04L 63/104* (2013.01); *G06Q 50/01* (2013.01); *H04L 51/32* (2013.01); *H04L 67/306* (2013.01)

(58) Field of Classification Search
CPC ..... H04L 63/104; H04L 67/306; H04L 51/32; G06Q 30/02; G06Q 30/10; G06Q 30/107
USPC ........................ 709/202–203, 207; 445/435.1
See application file for complete search history.

(56) References Cited

U.S. PATENT DOCUMENTS

| | | | |
|---|---|---|---|
| 6,480,885 B1* | 11/2002 | Olivier ................ | H04L 12/1859 709/202 |
| 6,681,108 B1 | 1/2004 | Terry et al. | |
| 6,748,395 B1 | 6/2004 | Picker et al. | |
| 6,839,682 B1 | 1/2005 | Blume et al. | |
| 6,922,672 B1* | 7/2005 | Hailpern ................ | G06Q 30/02 705/14.5 |
| 6,978,270 B1 | 12/2005 | Carty et al. | |
| 7,181,441 B2* | 2/2007 | Mandato ................ | H04L 12/58 |
| 7,680,770 B1* | 3/2010 | Buyukkokten ........ | G06Q 10/10 340/573.1 |
| 7,941,383 B2 | 5/2011 | Heck | |
| 7,966,369 B1 | 6/2011 | Briere et al. | |
| 8,036,930 B2 | 10/2011 | Brignull et al. | |
| 8,069,186 B2* | 11/2011 | Farnham ................ | G06F 3/0481 707/802 |

(Continued)

*Primary Examiner* — Backhean Tiv
(74) *Attorney, Agent, or Firm* — Lowenstein Sandler LLP

(57) ABSTRACT

Methods, systems, and computer programs are presented for managing electronic messages of users in a social network. One method includes an operation for receiving attributes of a profile of a person with a person account that has started following an entity with an entity account, in the social network. Further, the person is added to one or more groups in the entity account based on the attributes. Each of the groups is associated with defined properties for adding persons to each group. Furthermore, messages, created by the entity and addressed to the one or more groups, are distributed to a stream of the person account.

19 Claims, 10 Drawing Sheets

(56) References Cited

U.S. PATENT DOCUMENTS

| | | | |
|---|---|---|---|
| 8,364,770 B2* | 1/2013 | Ladouceur | G06Q 10/10 709/206 |
| 8,484,092 B1* | 7/2013 | Strand | G06Q 30/02 705/26.1 |
| 8,538,810 B2 | 9/2013 | Fox | |
| 8,793,319 B2* | 7/2014 | Turski | G06Q 10/107 705/319 |
| 8,863,245 B1* | 10/2014 | Abhyanker | G06Q 30/0631 726/4 |
| 8,880,600 B2* | 11/2014 | Lento | G06Q 10/10 709/204 |
| 8,954,864 B1* | 2/2015 | Thakkar | G06Q 10/107 715/739 |
| 8,965,409 B2* | 2/2015 | Abhyanker | H04W 4/21 455/456.3 |
| 9,123,080 B2* | 9/2015 | Terleski | G06Q 50/01 |
| 9,462,004 B1* | 10/2016 | Desikan | H04L 63/104 |
| 9,871,757 B1* | 1/2018 | Reardon | H04L 51/32 |
| 2002/0002705 A1* | 1/2002 | Byrnes | G06Q 30/02 725/14 |
| 2002/0023230 A1* | 2/2002 | Bolnick | G06Q 30/02 726/28 |
| 2003/0101451 A1 | 5/2003 | Bentolila et al. | |
| 2003/0167324 A1* | 9/2003 | Farnham | G06F 3/0481 709/224 |
| 2006/0031772 A1* | 2/2006 | Valeski | G06F 3/0481 715/751 |
| 2006/0143066 A1* | 6/2006 | Calabria | G06Q 30/0201 705/7.29 |
| 2006/0195442 A1* | 8/2006 | Cone | G06F 16/9535 |
| 2007/0067392 A1* | 3/2007 | Torres | G06Q 10/10 709/206 |
| 2007/0099701 A1* | 5/2007 | Simon | G06Q 30/02 463/40 |
| 2007/0106627 A1* | 5/2007 | Srivastava | G06Q 10/10 706/20 |
| 2007/0143128 A1* | 6/2007 | Tokarev | G06Q 10/10 705/347 |
| 2007/0143281 A1* | 6/2007 | Smirin | G06F 16/9535 |
| 2007/0192299 A1* | 8/2007 | Zuckerberg | G06Q 10/10 |
| 2008/0040437 A1* | 2/2008 | Agarwal | G06Q 10/107 709/206 |
| 2008/0040673 A1* | 2/2008 | Zuckerberg | H04L 67/306 715/745 |
| 2008/0130524 A1* | 6/2008 | Volach | H04L 67/306 370/259 |
| 2008/0222308 A1* | 9/2008 | Abhyanker | G06Q 10/10 709/245 |
| 2008/0243607 A1* | 10/2008 | Rohan | G06Q 30/02 705/14.69 |
| 2008/0250332 A1* | 10/2008 | Farrell | G06Q 10/10 715/753 |
| 2009/0063304 A1* | 3/2009 | Meggs | G06Q 10/06 705/26.62 |
| 2009/0070334 A1* | 3/2009 | Callahan | G06F 21/604 |
| 2009/0076995 A1* | 3/2009 | Uyama | G06Q 30/02 706/46 |
| 2009/0125377 A1* | 5/2009 | Somji | G06Q 30/0251 705/14.49 |
| 2009/0133071 A1* | 5/2009 | Sakai | H04N 5/4403 725/46 |
| 2010/0005518 A1* | 1/2010 | Tirpak | H04L 67/306 726/6 |
| 2010/0036912 A1 | 2/2010 | Rao | |
| 2010/0235235 A1* | 9/2010 | Hosseini | G06Q 30/00 705/14.49 |
| 2010/0257023 A1* | 10/2010 | Kendall | G06Q 30/02 705/14.46 |
| 2010/0257577 A1* | 10/2010 | Grandison | G06F 21/6245 726/1 |
| 2010/0281113 A1* | 11/2010 | Laine | G06Q 10/10 709/204 |
| 2010/0299276 A1* | 11/2010 | Shahine | G06Q 50/01 705/319 |
| 2010/0325127 A1 | 12/2010 | Chaudhuri et al. | |
| 2011/0004831 A1* | 1/2011 | Steinberg | H04N 21/454 715/753 |
| 2011/0047012 A1* | 2/2011 | Sherman | G06Q 10/10 705/14.1 |
| 2011/0060821 A1* | 3/2011 | Loizeaux | G06F 9/5072 709/224 |
| 2011/0153740 A1* | 6/2011 | Smith | H04L 67/20 709/204 |
| 2011/0246574 A1* | 10/2011 | Lento | G06Q 10/10 709/204 |
| 2011/0276396 A1* | 11/2011 | Rathod | G06Q 10/00 705/14.49 |
| 2011/0282947 A1* | 11/2011 | Dodson | G06Q 10/10 709/206 |
| 2011/0289011 A1* | 11/2011 | Hull | G06Q 10/107 705/319 |
| 2011/0289574 A1 | 11/2011 | Hull et al. | |
| 2011/0307803 A1* | 12/2011 | Carter | G06F 16/24575 715/751 |
| 2011/0314105 A1* | 12/2011 | Chen | G06Q 10/103 709/205 |
| 2011/0320373 A1* | 12/2011 | Lee | G06Q 50/01 705/319 |
| 2012/0042013 A1* | 2/2012 | Roman | G06Q 10/10 709/204 |
| 2012/0047219 A1* | 2/2012 | Feng | G06F 17/3071 709/207 |
| 2012/0079038 A1* | 3/2012 | Hersh | H04M 1/72552 709/206 |
| 2012/0110088 A1* | 5/2012 | Su | H04W 4/21 709/205 |
| 2012/0110621 A1* | 5/2012 | Gossweiler, III | G06Q 50/01 725/46 |
| 2012/0129585 A1* | 5/2012 | Laycock | G06Q 10/10 463/9 |
| 2012/0166284 A1 | 6/2012 | Tseng | |
| 2012/0191715 A1* | 7/2012 | Ruffner | G06F 16/93 707/738 |
| 2012/0197980 A1* | 8/2012 | Terleski | G06Q 50/01 709/203 |
| 2012/0197984 A1* | 8/2012 | Rao | G06Q 10/107 709/203 |
| 2012/0297038 A1* | 11/2012 | Mei | G06Q 50/01 709/223 |
| 2012/0328163 A1* | 12/2012 | Panzer | G06K 9/00677 382/115 |
| 2013/0006879 A1* | 1/2013 | Ramanathan | G06Q 10/10 705/319 |
| 2013/0013700 A1* | 1/2013 | Sittig | G06Q 10/10 709/206 |
| 2013/0018960 A1* | 1/2013 | Knysz | G06Q 50/01 709/204 |
| 2013/0024795 A1* | 1/2013 | Robotham | G06F 3/0486 715/769 |
| 2013/0055111 A1* | 2/2013 | Peyton | G06Q 10/10 715/753 |
| 2013/0091217 A1* | 4/2013 | Schneider | G06Q 50/01 709/204 |
| 2013/0097246 A1* | 4/2013 | Zifroni | G06Q 50/01 709/204 |
| 2013/0097253 A1* | 4/2013 | Mencke | G06Q 50/01 709/206 |
| 2013/0097529 A1* | 4/2013 | Postoaca | G06Q 50/01 715/753 |
| 2013/0283262 A1 | 10/2013 | Rehtijarvi | |
| 2013/0298006 A1* | 11/2013 | Good | G06Q 10/107 715/234 |
| 2014/0025748 A1* | 1/2014 | Mallet | G06Q 50/01 709/204 |
| 2014/0081960 A1* | 3/2014 | Gross | G06Q 30/02 707/723 |
| 2015/0039695 A1* | 2/2015 | Lento | G06Q 10/10 709/204 |

(56) References Cited

U.S. PATENT DOCUMENTS

| | | | | |
|---|---|---|---|---|
| 2015/0317375 A1* | 11/2015 | Haugen | .................... | H04W 4/08 |
| | | | | 707/738 |
| 2015/0334117 A1* | 11/2015 | Terleski | ................. | G06Q 50/01 |
| | | | | 726/27 |
| 2016/0112428 A1* | 4/2016 | Terleski | ................. | G06Q 50/01 |
| | | | | 726/4 |

* cited by examiner

AUTOMATIC GROUP ASSIGNMENT OF USERS IN A SOCIAL NETWORK

CLAIM OF PRIORITY

This application claims priority from U.S. Provisional Patent Application No. 61/556,161, filed Nov. 4, 2011, and entitled "Automatic Group Assignment of Users in a Social Network" and U.S. Non-Provisional patent application Ser. No. 13/667,825, filed Nov. 2, 2012, entitled "Automatic Group Assignment of Users in a Social Network", both of which are incorporated herein by reference for all purposes.

BACKGROUND

The communication capability provided by social networks has opened new forms of communication in today's society, making it easier for people to communicate with each other, as well as providing new vehicles of communications between people and businesses, or with other community groups. As people's interest in using social networks for communication has grown, so has the interest of businesses in using social networks to communicate with people, enabling a new form of communication for keeping customers informed and promote their products.

SUMMARY

Embodiments provide methods, systems, and computer programs for managing electronic messages of users in a social network. It should be appreciated that the present embodiments can be implemented in numerous ways, such as a process, an apparatus, a system, a device or a method on a computer readable medium. Several embodiments are described below.

In one embodiment, a method includes an operation for receiving attributes of a profile of a person with a person account that has started following an entity with an entity account. Further, the person is added to one or more groups in the entity account based on the attributes, the attributes being authorized by the person for adding the person to the one or more groups. Each of the groups is associated with defined properties for adding persons to each group. Furthermore, messages, created by the entity and addressed to the one or more groups, are distributed to a stream of the person account, where at least one operation of the method is executed through a processor.

These and other embodiments can include one or more of the following features:

The attributes in the profile include parameters with information about the person, and privacy setting for setting each parameter within the social network.

The privacy settings are selected from a group consisting of everyone, extended groups, my groups, only you, or custom privacy.

The properties for adding persons are selected from a group consisting of location, age, gender, language, country, region, or interest.

The properties for adding persons are processically generated.

The defined properties are obtained using a Boolean combination of single properties.

Proving a plurality of user properties to the entity for creating groups of user; and detecting selection of one or more user properties to create each of the one or more groups in the entity account.

Detecting a creation of a manual group be the entity; and enabling inclusion of persons in the manual group by the entity.

The content of the one or more groups is disabled for inspection by the person receiving the distribute message.

Distributing messages to persons belonging to an intersection of two groups.

In another embodiment, a method includes an operation for receiving an electronic message created by a first entity and sent to a first group defined by the first entity in the social network. The first group includes a second entity. A second group, defined by the second entity in the social network, is selected, and the electronic message created by the first entity is sent to persons or entities included in the second group. At least one operation of the method is executed through a processor.

These and other embodiments can include one or more of the following features:

Sending the electronic message to persons and entities included in the second group.

Sending the electronic message to persons included in the second group and omitting from the electronic message entities included in the second group.

Sending the electronic message to entities included in the second group and omitting from the electronic message persons included in the second group.

The second entity is an affiliate company of the first entity.

Operations of the method are performed by a computer program when executed by one or more processors, the computer program being embedded in a non-transitory computer-readable storage medium.

In yet another embodiment, a computer program embedded in a non-transitory computer-readable storage medium, when executed by one or more processors, includes program instructions for receiving attributes of a profile of a person with a person account that has started following an entity with an entity account in the social network. The computer program further includes program instructions for adding the person to one or more groups in the entity account based on the attributes. Each of the one or more groups is associated with defined properties for adding persons to each group. Additional program instructions are included for distributing messages created by the entity and addressed to the one or more groups to a stream of the person account.

These and other embodiments can include one or more of the following features:

Program instructions for obtaining the attributes in the profile from a plurality of accounts of the person.

Program instructions for inspecting members of the at least one of the one or more groups.

Members of at least one of the one or more groups are not visible to the entity.

These and other embodiments may provide one or more of the following advantages: user control of entity communications; improved message targeting; and diminution of undesired electronic messages.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIG. 4 shows a profile page of an entity in the social network, according to one embodiment.

FIG. 6B is a web page for the management of affiliated entities, according to one embodiment.

DETAILED DESCRIPTION

The following embodiments describe methods, systems, and computer programs for managing communications to users of a social network, and particularly from entities to people. It will be apparent, that the present embodiments may be practiced without some or all of these specific details.

Figure 1:
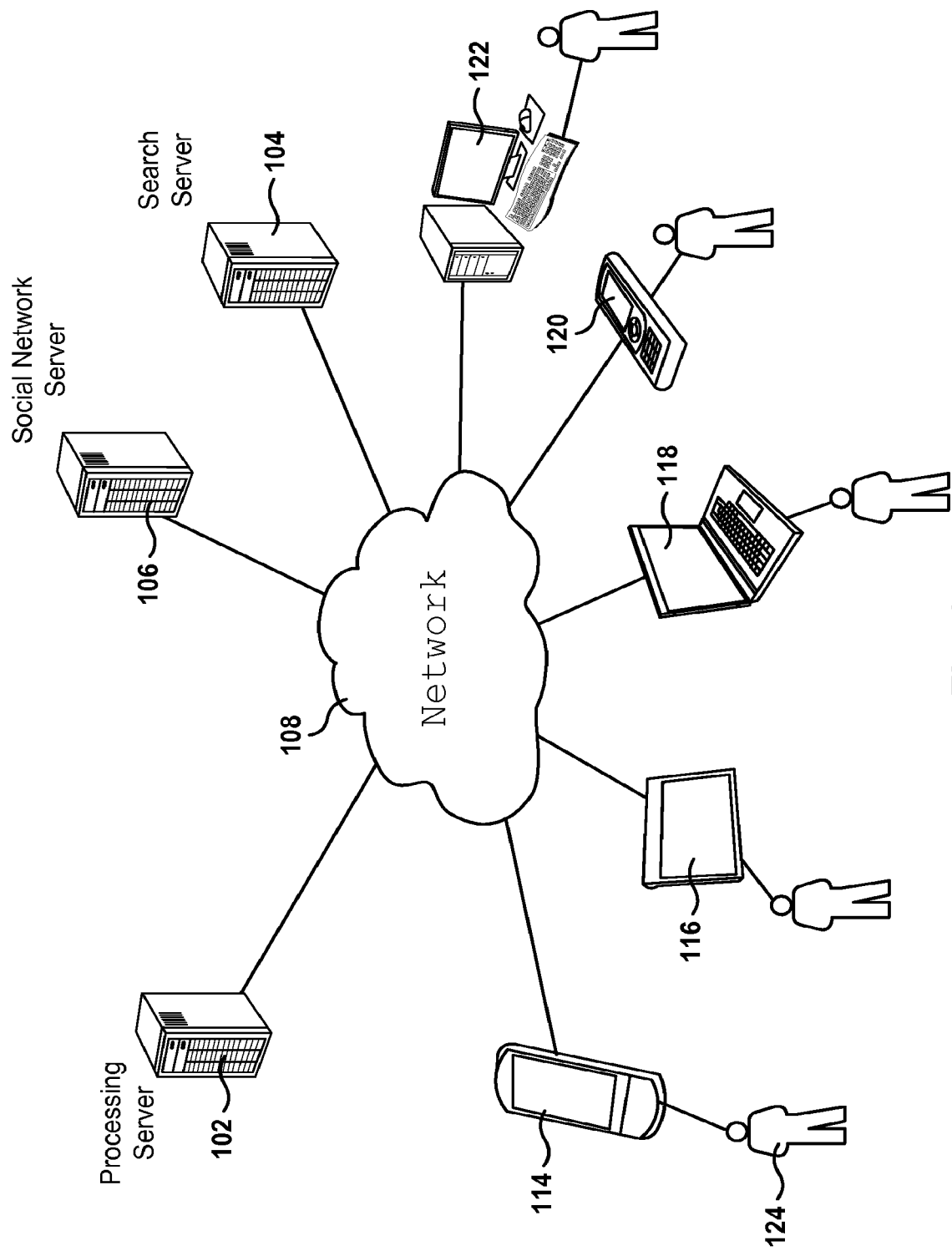
FIG. 1 provides one example architecture of a system that may utilize embodiments described herein.

FIG. 1 provides one example architecture of a system that may utilize embodiments described herein. Users 124 interact with each other in the context of a social network, where users include real people and entities. In one embodiment, entities perform interactive actions similar to people, although an entity may not be an individual person. For instance, an entity may be a commercial enterprise that may wish to market goods or services. In some embodiments, a person may be an entity as well when the person is acting as a public figure, such as a popular artist, a political figure, a world leader, etc. Each user has an account in the social network, and the account includes at least a user name. In addition, each account includes a profile of the user with additional information about the user, such as birth date, gender, residence, favorite activities, etc. The user is control of what information is added to the profile, and what information is shared with others. A user may access the social network through different devices such as a smart phone 114, a tablet computer 116, a laptop 118, a mobile phone 120, a personal computer 122, or any computing device that provides access to the Network 108. Of course, the illustrated devices are only examples.

In one embodiment, social network server 106 delivers services that enable users to interface with each other. The social network provides a site that enables users to define user accounts, which can be people accounts and entity accounts. Through those accounts, users are able to connect with their friends, group of friends, entities, groups of entities, etc. In one embodiment, the relationships established in the social network may be utilized in other contexts. Processing server 102 manages the electronic messages between persons and non-person entities, by enforcing rules that enable or disable electronic messages and/or actions within the social network. Search server 104 provides Internet search capabilities.

In one embodiment, the social network provides customizable controls that people may use to manage interactions and electronic messages with non-person entities. In one example, the logic executing the social network may define various services and controls. One example service is designed for real person users (e.g., people accounts). Another example service is designed for non-person entities (e.g., entity accounts). The entity account of the entity, on the other hand, is similar to a user account of a person, however the services and controls are different. As noted above, an entity may be a business, a famous person or figure, a commercial figure, an artist, a celebrity, a government group, a brand, a political figure, a community association, a non-profit organization, an entity that provides services, an entity that provides goods, an entity that provides goods and services, etc. Furthermore, the entity may provide its goods or services primarily on the Internet, primarily as a brick and mortar outfit, or a combination thereof. For description purposes, a real person may be referred to herein as a person, people, or an individual.

For description purposes, a non-person entity may be referred to herein as simply an entity, a company, a corporation, a business, an entity account, etc. An entity may be a user, although its use will be through an entity account. A user, as referred to herein, is a generic term for a person or entity, unless otherwise noted. A non-entity user, therefore, may utilize the social network through a user account.

In one embodiment, the social network provides entities with a specific type of interface for posting messages, sharing, and generally interacting within the social network. In one embodiment, this interface for entities is referred to as "entity pages," indicated by a token, e.g., "+", followed by the name of the entity in the social network (e.g., Acme corporation has a "+Acme" page). Real-persons have "person pages," which are different from entity pages and have different functionality, although some features are common to both entity pages and person pages. Although the symbol "+" and word "plus" is referred to herein as denoting a type of site or place within the social network, it should be appreciated that any symbol, identifier, word, or character may be used to define or identify the social services. In an alternate embodiment, the services can be provided without the use of any special symbols or denoted nomenclature. Thus, so long as the social network site provides the functionality defined herein, the nomenclature utilized to denote the services can take on any form, format or identifier.

In one embodiment, a real person may act as an entity. For example, the real person may be a public figure which uses the social network to promote commercial or social activities associated with this persona. In this case, the person is treated by the social network as an entity because the main purpose of the public figure is to promote commercial or social activities. This person may, for example, have a user account as well as an entity account. The user, when acting for the entity, will login to her entity account. The user can therefore act in various roles, consistent with their login parameters or assigned privileges. In one embodiment, a user can have multiple privileges, which will allow the user to log into her one account, and based on her privileges, will be allowed to access both accounts. Alternatively, each account will have its own login.

In one embodiment, a person is always in control of her relationships with entities (e.g., entity pages). In one embodiment, interactions between person and entity require person approval (e.g., an addition of the entity page to the person's social network, or a mention by the person of the entity, which are discussed in more detail below). Otherwise, entity pages present a similar behavior as person pages, once the person has initiated engagement with the entity.

Other embodiments may utilize different servers, have the functionality of one server distributed over a plurality of servers, have the functionality of two or more servers combined into a single server, have a different amount of user categories in the social network, categorize users by different criteria, etc. The embodiments illustrated in FIG. 1 should therefore not be interpreted to be exclusive or limiting.

Figure 2:
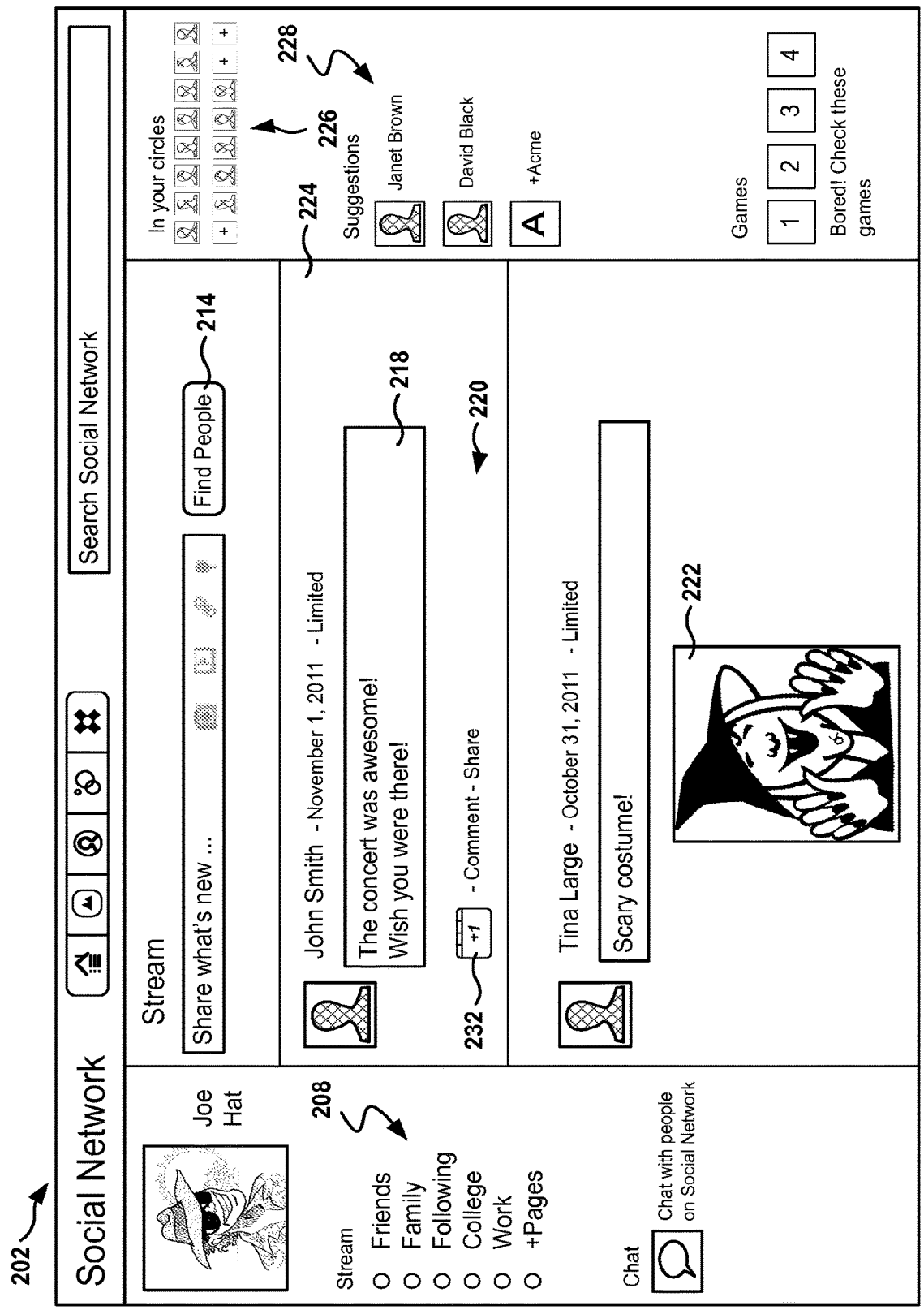
FIG. 2 is a person's web page for interfacing with a social network, according to one embodiment.

FIG. 2 is a person's web page for interfacing with a social network, according to one embodiment. For example, the person is shown logged into her user account. In one embodiment, posts received by a user are referred to as content of a stream in the social network. Page 202 is an example snapshot of a page for viewing a person's stream in the social network, and search field 204 is an input area for searching the social network or other content.

In one embodiment, the stream is presented in a middle panel of page 202. Input box 212 enables the person to add new posts in the social network. When the person enters a new post, the person is able to select the destination for the post. The destination could be to the complete social network (e.g., a public post), to a person, or to one or more groups defined by the person.

In one embodiment, the groups defined by the person are referred to as "circles," but other configurations for defining groups are also possible. Examples include various graphically designed interfaces or text based lists, dialog boxes, pull downs, radio buttons, and other interfaces defined from a combinations of graphical elements, text, images, pictures, combinations thereof, etc. In one embodiment, the post may be a text message, a photo, a video, a link to a webpage, or a location of the person. Thus, the content and form of the post should be broadly construed to include any data that can be presented, displayed, listened to, interfaced with, received, sent, shared, approved, or disapproved, etc.

In one embodiment, the stream includes posts added by the person, by others socially linked to the person, or by an entity that the person has chosen to follow (e.g., be linked with/to in the social network). In one embodiment, an entity may be restricted from posting to a person's stream, unless the person has established a social link with the entity beforehand, e.g., the person has chosen to follow the entity.

In one embodiment, each post 224 may include information 216 about the author, the timestamp of the post, and the scope of the post (e.g., public, limited, etc.). Example post 224 may include a text message entered by person "John Smith," but other types of posts are possible, such as photo 222, a video, a link, data, etc. The social network provides options 220 to respond to the post, such as providing an endorsement of the post, adding a comment to the post, or sharing the post with others.

As used herein, an endorsement is a public recommendation of an item, such as a webpage, a person, a post, an entity, etc. An endorsement may also be referred to or provided as an acknowledgment, a +1, a thumbs-up, a √ (check) mark, a confirmation, a ratification, a validation, a seal of approval, a testimonial, support, advocacy, an approval, a ratification, etc. In one embodiment, a button is provided in various web pages to enable the person to provide his or her endorsement. See for example +1 button 232.

In another embodiment, for a link to be established in the social network between the person and the entity, a different operation is required where the person explicitly adds the entity to the person's social network. The explicit add can by performed by user selection on an interface, addition of an entity to one of their groups, e.g., circle, or selection of a button to follow the entity. The following can also be triggered automatically, based on the user's approval to take this action each time the user views, finds, selects, or interfaces with an account of an entity.

In one embodiment, a "mention" is an explicit reference to a user in an electronic message. A mention allows the creator of the post to grab someone's attention to a post because of the introduction of a mention identifier with, for example, someone's name In one embodiment, a mention is performed by utilizing the '+' or '@' signs followed by the name of a person or entity. It is noted that a "+" sign may be used to mention a person or an entity. When a person or an entity is mentioned within the context of the social network, the person or entity may receive a notification that the person or entity has been mentioned in a post (depending on notification settings). The user is also able to see the entirety of the post on which the user is mentioned, even if the post wasn't originally shared with the user.

Button 214 gives the person the ability to enter a different webpage, which provides an interface to identify search parameters for finding people or entities in the social network. A profile picture of the person 206 may be provided on the left side of page 202. In addition, stream filtering options 208 allows the person to limit or tune what is presented on the stream. In one embodiment, the filtering options included radio buttons to select or deselect the groups created by the person. In addition, the filtering options also include a radio button to enable or disable messages from entity pages in the stream. Although radio buttons are used, other types of user selectable controls may be used, such as drop downs, text fields, toggles, voice inputs, etc. In one embodiment, a chat button 210 is provided to allow the person to engage in conversation with others in the social network. On the right panel, icons 226 represent users in the social network that are linked with the person. In addition, the social network provides suggested new users in area 228. It is again noted that the layout of the features on the page 202 is only one example, and the layout can vary based on site designer preferences.

The person is able to perform certain operations affecting the relationship between the person and the entity. The person may endorse the entity, or the person may add the entity to one of her social groups defined in the social network.

Figure 3:
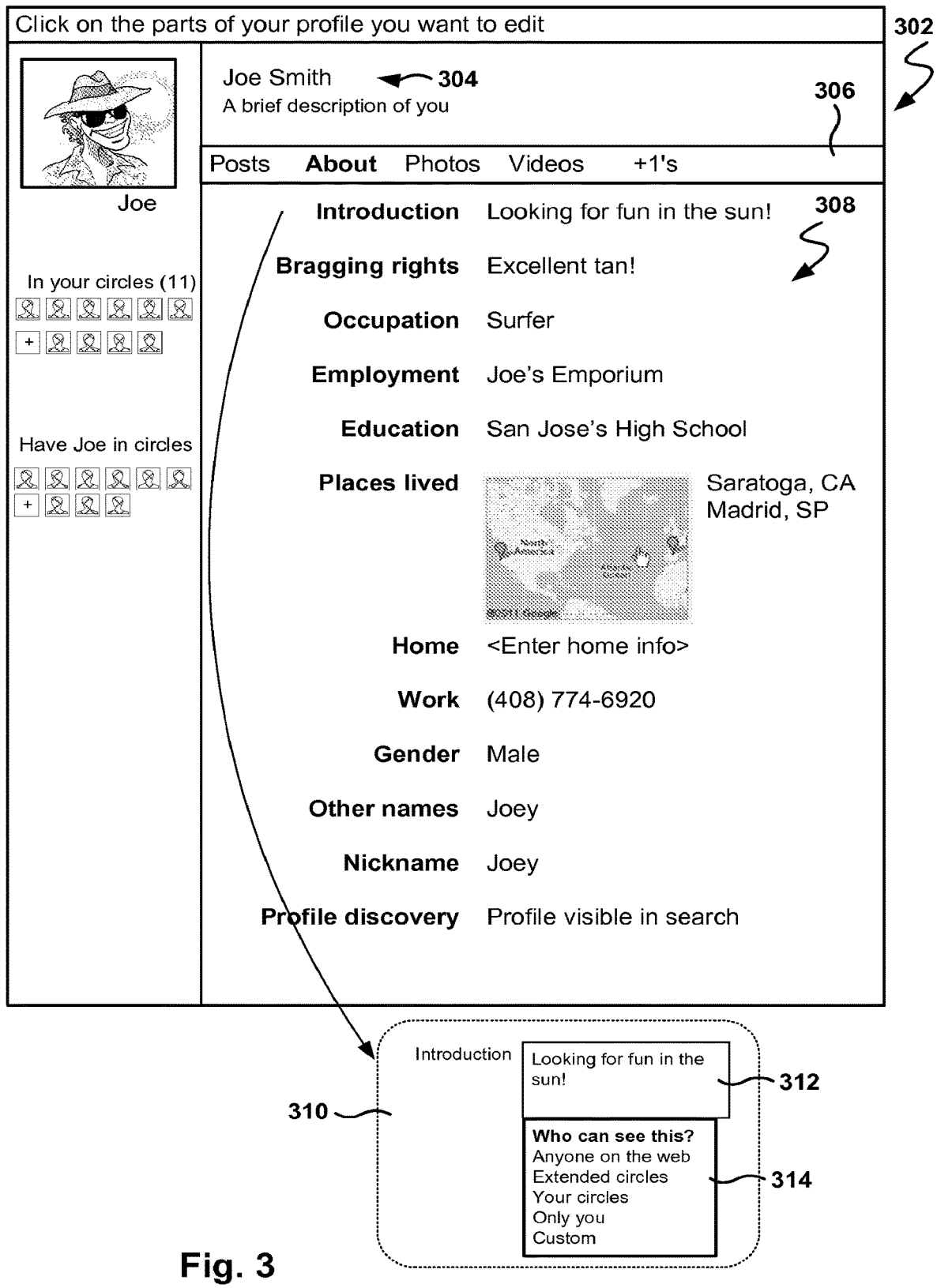
FIG. 3 is a web page for entering user profile attributes, according to one embodiment.

FIG. 3 is a web page for entering user profile attributes, according to one embodiment. The user has selected the option "About" 306 in page 302 to edit the profile. In one embodiment, one or more profile attributes are entered the first time that a user signs up the social network. Some user attributes are mandatory, such as name 304, in order to create the account. Additionally, the user has the option of adding other attributes when joining the social network, or the user may select page 302 to add or change profile attributes at a later time.

A list of user attributes is provided on entry panel 308. Next to each attribute, the current value of the attribute is presented, if the value exists. In the example of page 302, the person has and occupation of "Surfer," has his place of employment at "Joe's Emporium," etc. When the user selects one of the attributes, an input window is presented, which provides one or more fields to the user for entering the appropriate values for the attribute. The value for an attribute may be a single item, such as age, or may include a list of values, such as "places to live." Other attributes may include text (e.g., introduction), photos (e.g., profile photos), addresses, phone numbers, etc.

Input panel 310 presents the input field 312 to the user for entering the text for the Introduction attribute, which will be seen by other users of the social network in the profile of the user. Besides the input field 312, a privacy setting 314 is presented to the user for selecting the visibility of this attribute to others in the social network. In one embodiment, the options are "Anyone on the web," Extended circles (friends and friends of friends), Your circles (shown only to those in the person's circles), Only you (visible only to the user), and Custom, which provides further options for defining the privacy settings of the attribute.

In one embodiment, the attributes present in the profile of the user also include attributes that the user has entered in other Internet services. For more details see the description below with reference to FIG. 7.

Other embodiments may utilize different attributes, present the attributes in a different form, have different privacy options, etc. The embodiments illustrated in FIG. 3 should therefore not be interpreted to be exclusive or limiting.

Figure 4:
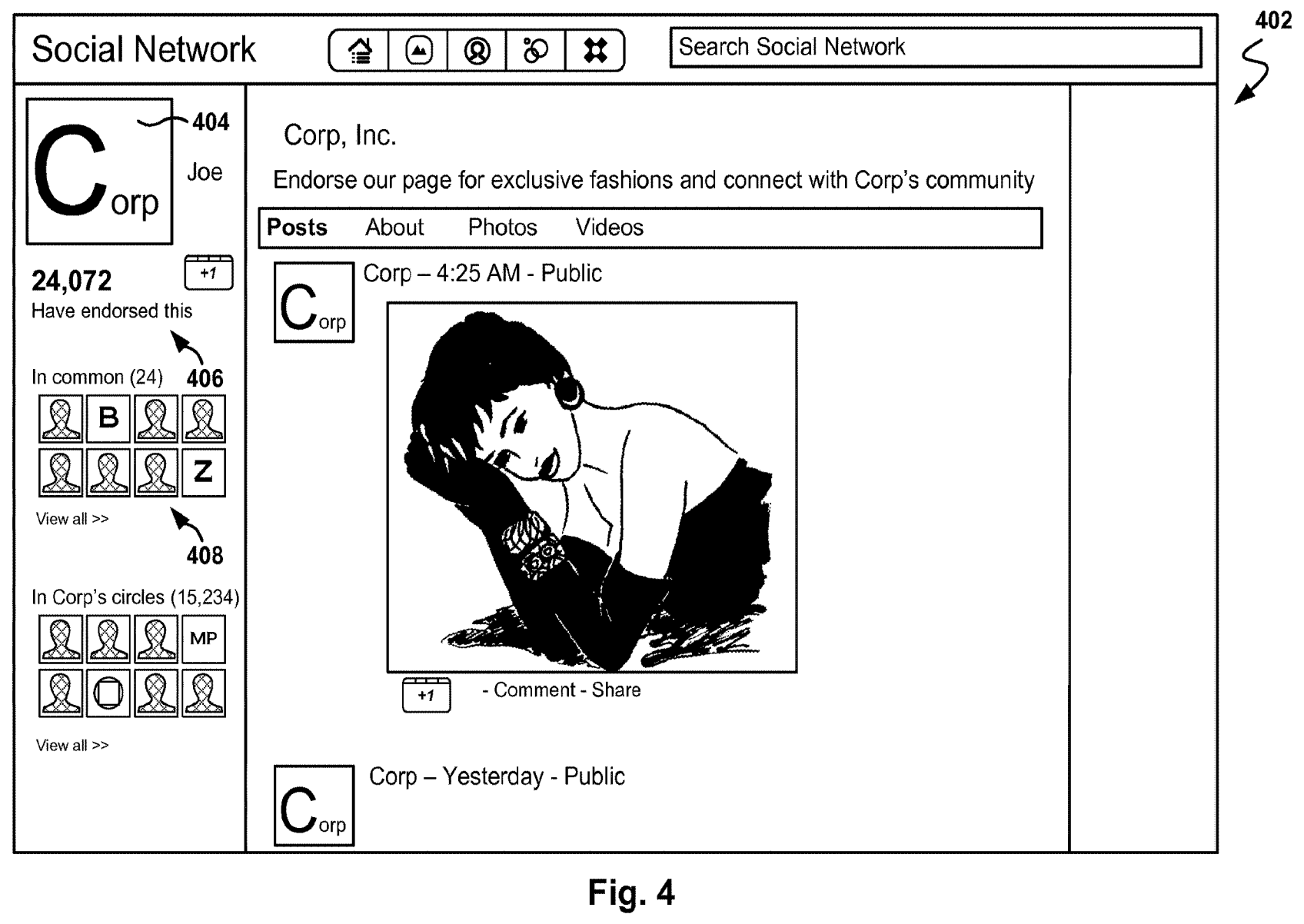

FIG. 4 shows the profile page 402 of an entity in the social network, according to one embodiment. When a user clicks on the name of another user, the associated profile page for the user is presented. FIG. 4 shows the profile page of an entity. In the middle panel, posts from the entity that are visible to this user are presented, with a similar format to the posts shown in the stream of FIG. 2.

The profile page 402 includes a region that can accept an icon 404 associated with the entity and the name of the entity next to the icon 404. In addition, an endorsement button 412 gives the person or other entity an option for endorsing the entity associated with the profile page. Counter 406 provides information about the number of people or entities that have endorsed this entity. In one embodiment, the profile page of a person may not include endorsement button 412. In another embodiment, the social network allows for the endorsement of real people, and an endorsement button is available to endorse people.

Profile page 402 also includes information about users 408 in the user's circles that are also following this entity, e.g., users "in common" following this entity. This information helps the entity improve its corporate image by showing related users that also are associated with the entity. In addition, information 410 is provided about users or entities of the social network that are in the entity's circles but that are not currently in any of the user's circles.

In one embodiment, the social network enforces a privacy mechanic, e.g., a policy, to protect people from undesired messages. In one embodiment, the policy defines two types of users: people and entities. The electronic messaging rules in the social network are different for people and for entities. A person may initiate contact with an entity, but the entity may not initiate contact with the person. Once the person establishes a social link with the entity (e.g., the person adds the entity to one or more circles), then the entity may start exchanging electronic messages with the person. In one embodiment, an entity may initiate contact with other entities (of course, subject to user privacy settings), but not with real people (e.g., people accounts). This policy puts the person in command of the message flow between people and entities.

Figure 5:
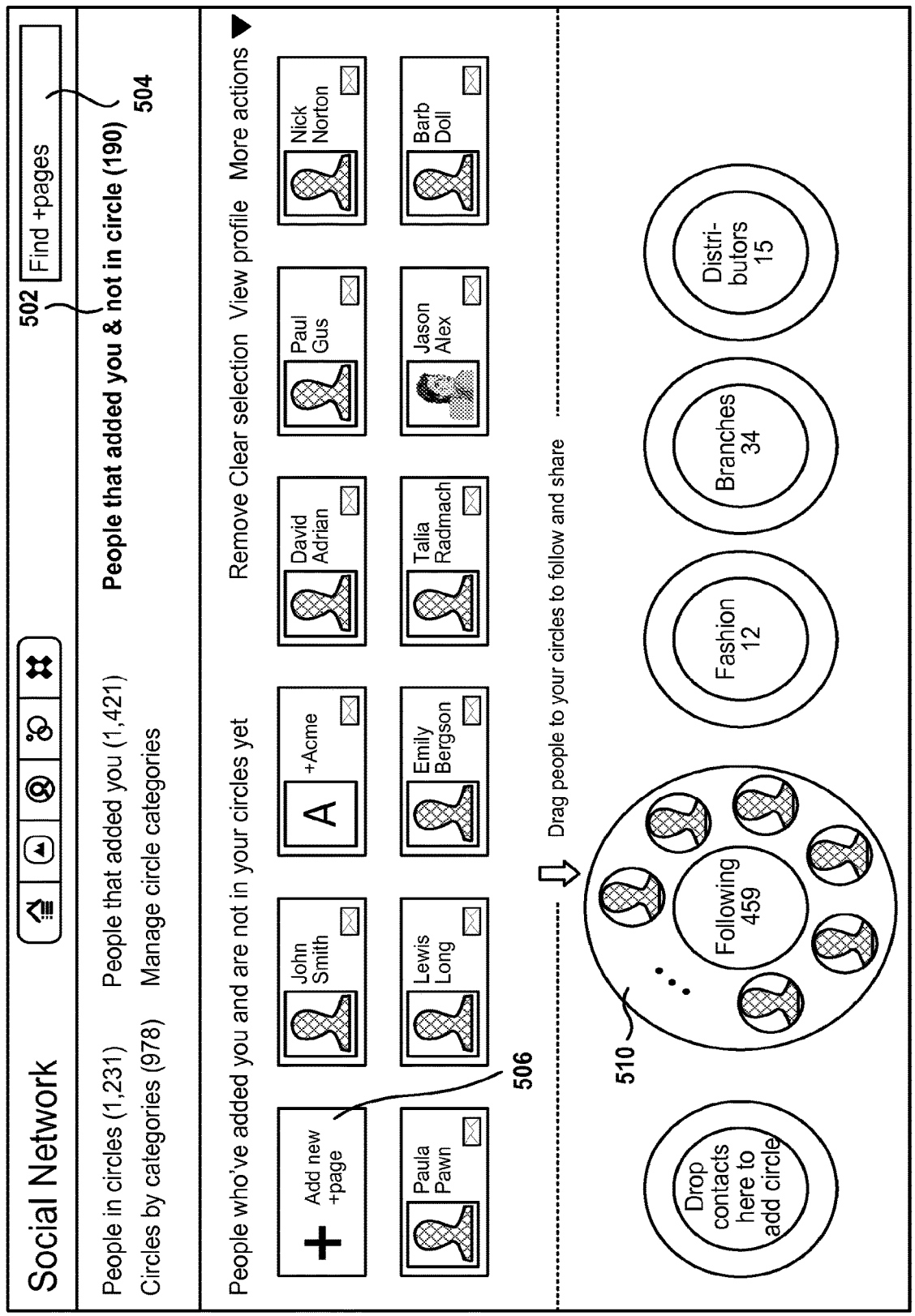
FIG. 5 is a web page for the management of user groups by an entity, according to one embodiment.

FIG. 5 is a web page for the management of user groups by an entity, according to one embodiment. Bar 502 provides selections options for choosing users, which are then displayed in users area 508. In the embodiment shown in FIG. 5, the entity has selected the option "People that added you & not in circle" to display users are not yet in the entity's circles, but that may be added to the circles. Other options include showing people currently in the entity's circles, showing all the people that have added the entity (e.g., are following the entity), circles created by category (described below in more detail with reference to FIG. 6A), and manage the categories for defining automatic circles ("Manage circle categories").

Users area 508 displays icons, images, pictures or indicators associated with several users, and circles area 512 includes the groups defined by the entity. In one embodiment, the entity is able to add users to the circles in circles area 512 by selecting a user icon, dragging the icon to the circles area 512, and dropping the icon in one of the circles. To delete a user from a circle, the user icon inside the circle is dragged from the circle and dropped outside the circle. In one embodiment, when the user moves the mouse over a circle, the circle is enlarged to show the user icons corresponding to the users belonging to that circle. For example, after placing the mouse over circle 510, circle 510 is expanded, having now a larger size than the other circles, and presenting the users currently in that circle.

The users in user area 508 can be real persons (e.g., person "John Smith") or can be entities (e.g., entity "+Acme"). Users are able to place real persons or entities in any of the circles below, and a circle may have just people, just entities, or a mix of people and entities.

An entity may search for other entities (e.g., +pages). Entities are provided with icon 506 to add other entities. Although the functions of this mechanic are described with reference to icons that are present or not present, other icons, text, windows, selection features may be used.

In one embodiment, the social network provides a default circle 510 to the entity for adding users followed by the entity. Circle 510, named "Following" in the sample of FIG. 5, is intended to be used for adding users that are being followed by the entity, in response to the person's initiated following of the entity. However, the entity may add other circles and organize the users followed as desired by the administrator of the entity page. For example, the embodiment of FIG. 5 illustrates a page that includes, besides the Following circle 510, a Fashion circle (e.g., to include other related companies in the fashion industry), a branches circle (e.g., to include retail outlets for the entity), and a Distributors circle (e.g., to include the distributors that carry the entity's products).

The entity may add each user to more than one circle. For example, the entity might create circles by geographic location in order to better target marketing messages (e.g., United States, South America, Europe, Asia, etc.), or may create circles according to demographic criteria (e.g., 18-25 years old, 25-50, and 51+). The number and type of circles (e.g., groups) created by the entity are limitless. The circles can be created for limited times, and people can be dynamically moved by the entity or by an process set by the entity.

Figure 6A:
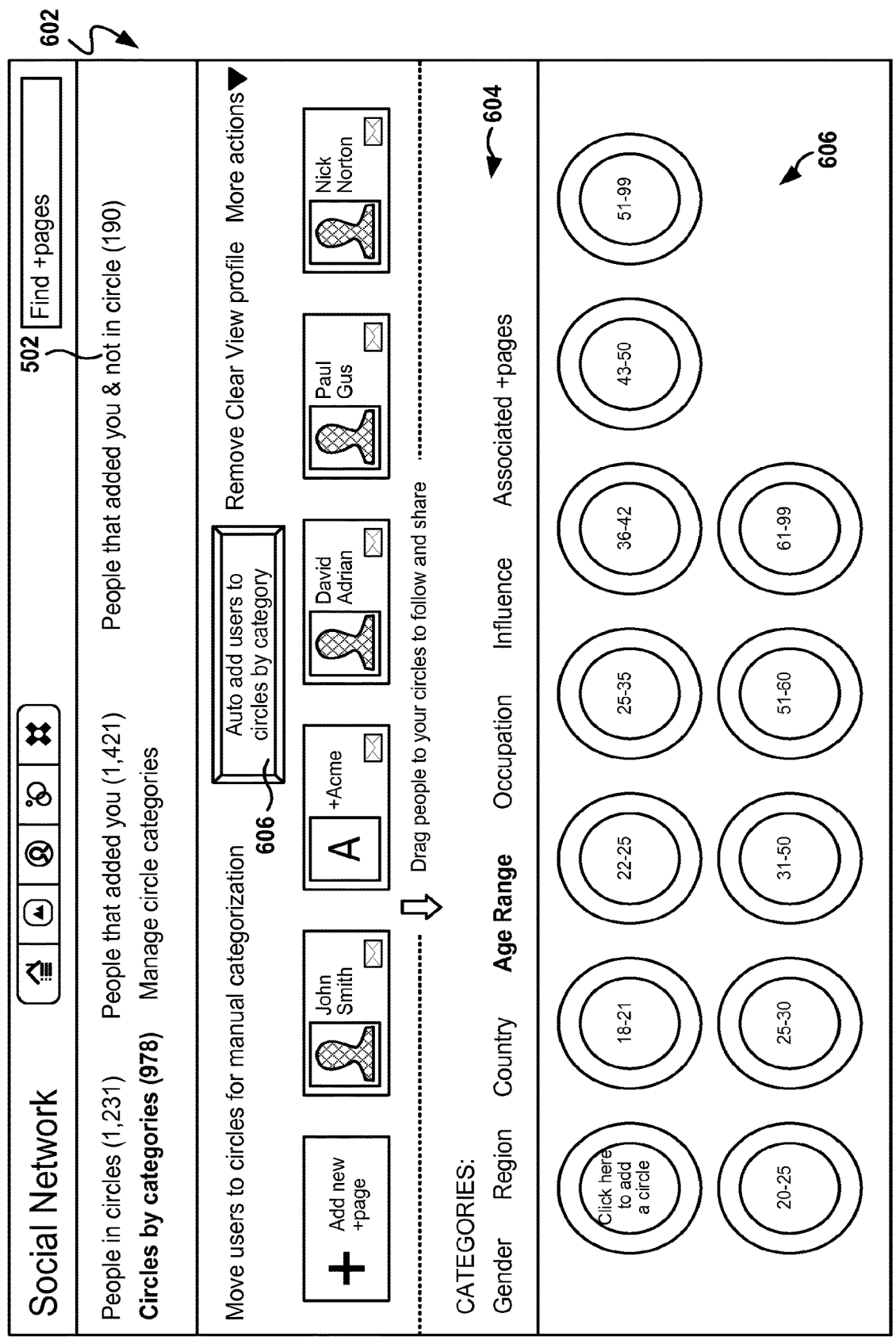
FIG. 6A is a web page for the automatic addition of people to groups of an entity, according to one embodiment

FIG. 6A is a web page for the automatic addition of people to groups of an entity, according to one embodiment. Page 602 shows a sample page presented to an entity administrator when the option to automatically populate circles is selected (e.g., the administrator has selected "Circles by categories" in bar 502).

In one embodiment, the social network provides an automatic creation of circles, based on the parameters selected by the entity and executed by the process, or based on user characteristics. In one embodiment, this feature is referred to as suggested circles. The suggested circles feature enables an entity to organize its followers. Circles whose users are added manually by an administrator (e.g., with a drag and drop operation on the circle, as described above) are referred to herein as manual circles.

Each smart circle is associated with one or more circle properties. The circle properties define the attributes that a user must have to be automatically included in the circle. The circle properties may be related to one or more user attributes. Circle properties may be built by combining (e.g., utilizing Boolean expressions) a plurality of required values for user attributes. For example, a circle property may be defined as users between the ages of 18 and 21, and another circle property may be defined as "male" AND ("living in San Francisco" OR "living in San Jose").

User attributes may include geographic location, age range, gender, language, country, interests, social influence, affinity, important customers (VIPs), customers, journalists, etc. In one embodiment, circles may be filled with a mixture of manual and processic additions. In one embodiment, the entity is able to manually assign people to suggested circles according to their characteristics in order to customize marketing communications or any other type of communication. For example, a circle may be initially created based on a user attribute, but an administrator may later on add other users manually to the circle.

In one embodiment, when a person first starts following an entity, the person is automatically added to the entity's suggested circles with defined characteristics that match the person's attributes. For example, a person is added to a circle for the city of San Jose if the person lives in San Jose, the person is added to a circle for ages from 18 to 21 if the person is 19 years old, the person is added to a circle for United States if the person lives in the United States, etc. In another embodiment, users are added to circles when the administrator selects an option to perform the automatic addition of users, such as by selecting button 606 on page 602. All users that are not included in any circle will be added to the corresponding circles. In another embodiment, the administrator may select one or more users, and upon selection of button 606, the selected one or more users will be automatically added to circles.

It is noted that a person is added to suggested circles if the person has provided the corresponding information (e.g., attributes) to the social network (e.g., provided the information in the user profile is described above with reference to FIG. 3). Additionally, the privacy constraints for each attribute must allow the entity to receive the value of this attribute for each user, because the person has allowed the social network to use this attribute to be shared with other users. In one embodiment, if a circle, associated with a user attribute, contains a large number of users, the social network may let the entity learn about the content of the circle, as long as there is enough diversity so the entity will not be able to learn specific information about a user. For example, a circle may be defined as "users in MTV" and, if the circle contains more than 1,000 members, then the entity will be enabled to see the contents of the circle. Other values may be used to define the threshold number of users in the circle (such as 5,000; 100,000; 1,000,000, etc.), depending on the category, as long as the number is large enough to be reasonably certain that user privacy is protected.

In one embodiment, the content of some suggested circles is not available for inspection by the entity. This way, the entity does not receive information about the person, although the entity can target its marketing messages to the appropriate segments due to the infrastructure provided by the social network. For example, the entity may send a message to followers in San Francisco, but the entity may not know who the followers from San Francisco are.

The mechanic of suggested circles, in one embodiment, is transparent to people, and settable by administrative functions of the entity. For example a person might receive a message from a company, but the person does not know why she received the message. The reason the person received the particular message may be, for example, because the entity decided to send that message to all of the people or entities that were part of one of their circles. As another example, the entity may decide to move certain people and entities into a circle for an upcoming event. Before the event, the entity can set a campaign to notify those people and entities regarding information, specials, coupons, etc., as it pertains to the upcoming event. Once the event is done, the entity can manually move the people and entities back to their originally established default circles. In still another embodiment, the users that were added to the event circle can simply be copied (as a second instance) to the event circle. When the event is done, the event circle is deleted. The users, however, are still present in their previously defined circles of the entity. In yet another embodiment, users may receive information on why they received the message, such as the name of the circle or category that was used to send the message, or some other related information (e.g., "you received this message because Company X sent this invitation to residents of San Francisco and you live in San Francisco").

Category selection bar 604 provides options to select categories by which to categorize users. The example of page 602 shows that the administrators has selected "Age Range" category, and the circle area 606 shows circles based on the age of users. It is noted that the circles within a category do not have to be mutually exclusive, because users may be assigned to multiple categories. This gives the entity more flexibility in selecting circles for sending a specific messages through the social network. In one embodiment, categories may be defined according to rules or logic configurable to determine the members. For example, a category may be "Users who are likely to re-share my message," or "influencers," or "people that are very active in the social network," etc. The circle members will be calculated according to the defined rules or logic.

Figure 6B:
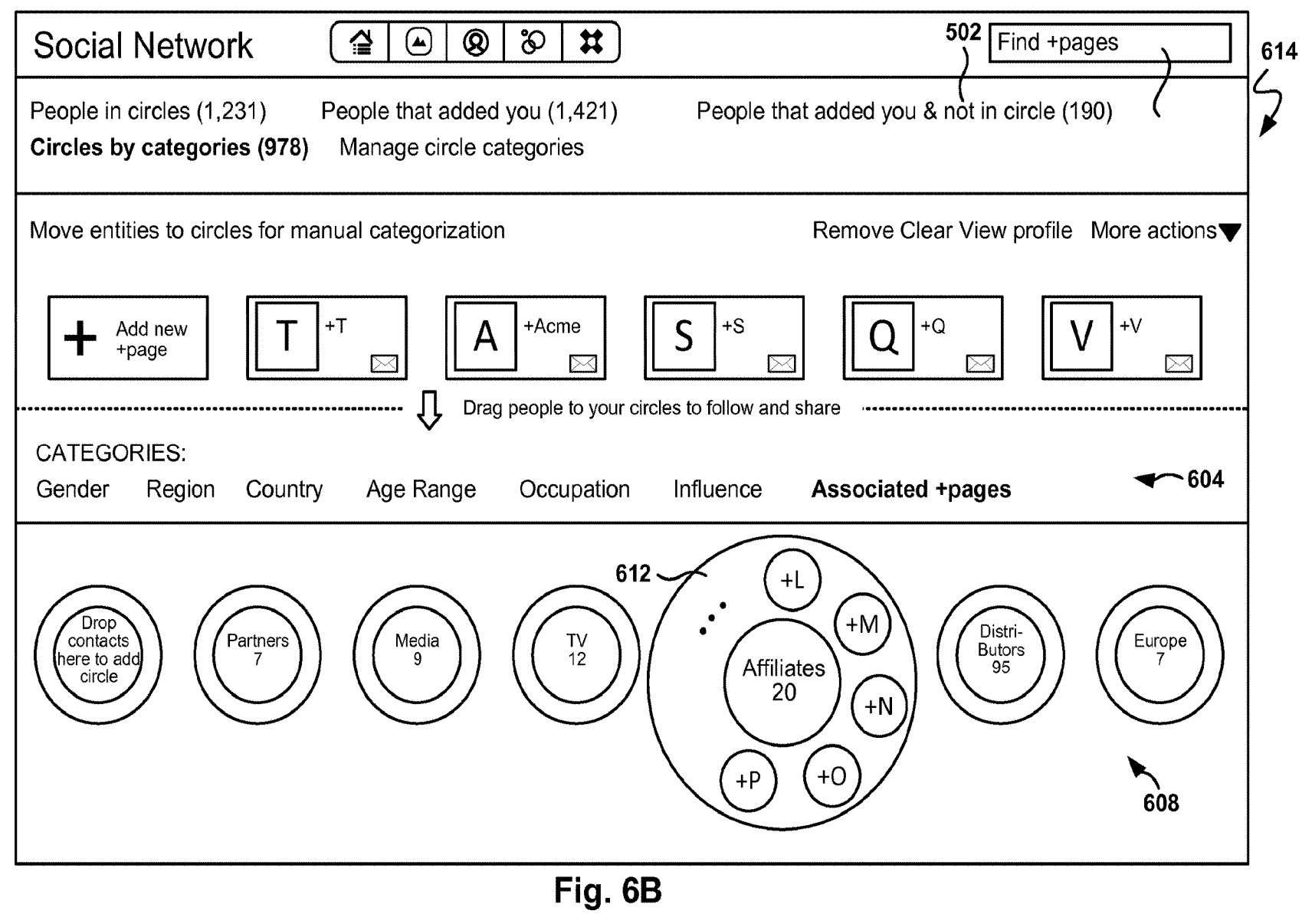

FIG. 6B is a web page for the management of affiliated entity pages, according to one embodiment. Some business organizations have complex relationships with other business entities. For example, a business may be a subsidiary of another business, have a plurality of different business units selling different products, have operations in different countries, sell through different distribution channels, etc. Embodiments provide tools to enable entities to better define the targets for their marketing communications by enabling entities to define affiliated entities, and to define the circles of the affiliated entities.

In one embodiment, an entity is enabled to utilize affiliated entities for electronic messaging, such that a message sent to the affiliated entities (e.g., to a circle having the affiliated entities) will reach those in the circles of the affiliated entities. This provides a mechanism that is similar to extended circles, but, unlike with extended circles, the messages targets are under the control of a single administrative unit. With extended circles, a user cannot control the ultimate recipient of a message, because the recipients are determined, in part, by the circles defined by direct friends. In one embodiment, the same user account may be utilized to administer a plurality of affiliated business entities.

In another embodiment, each circle in an affiliated entity has an associated message delivery capability, such that the same message, when sent to different circles will appear different to the recipients associated with each of the circles. For example, a circle may be associated with Italy and another circle may be associated with Greece. When a message is sent to both circles, the message will be translated to Italian or Greek, depending on the circle.

Returning now to FIG. 6B, page 614 shows the circle definition page when the administrator has selected the option 604 to work with "Associated +pages" for managing the business affiliations of the entity. In this example, a plurality of circles has been defined regarding the business associations of the entity, such as Partners, Media, TV, Affiliates, Distributors, and Europe. The entity is able to manage the contents of each of the circles, by adding or deleting entities. As previously discussed, when a message is posted to a circle of an affiliated company, the message will reach the users in the affiliated company's circles.

Figure 7:
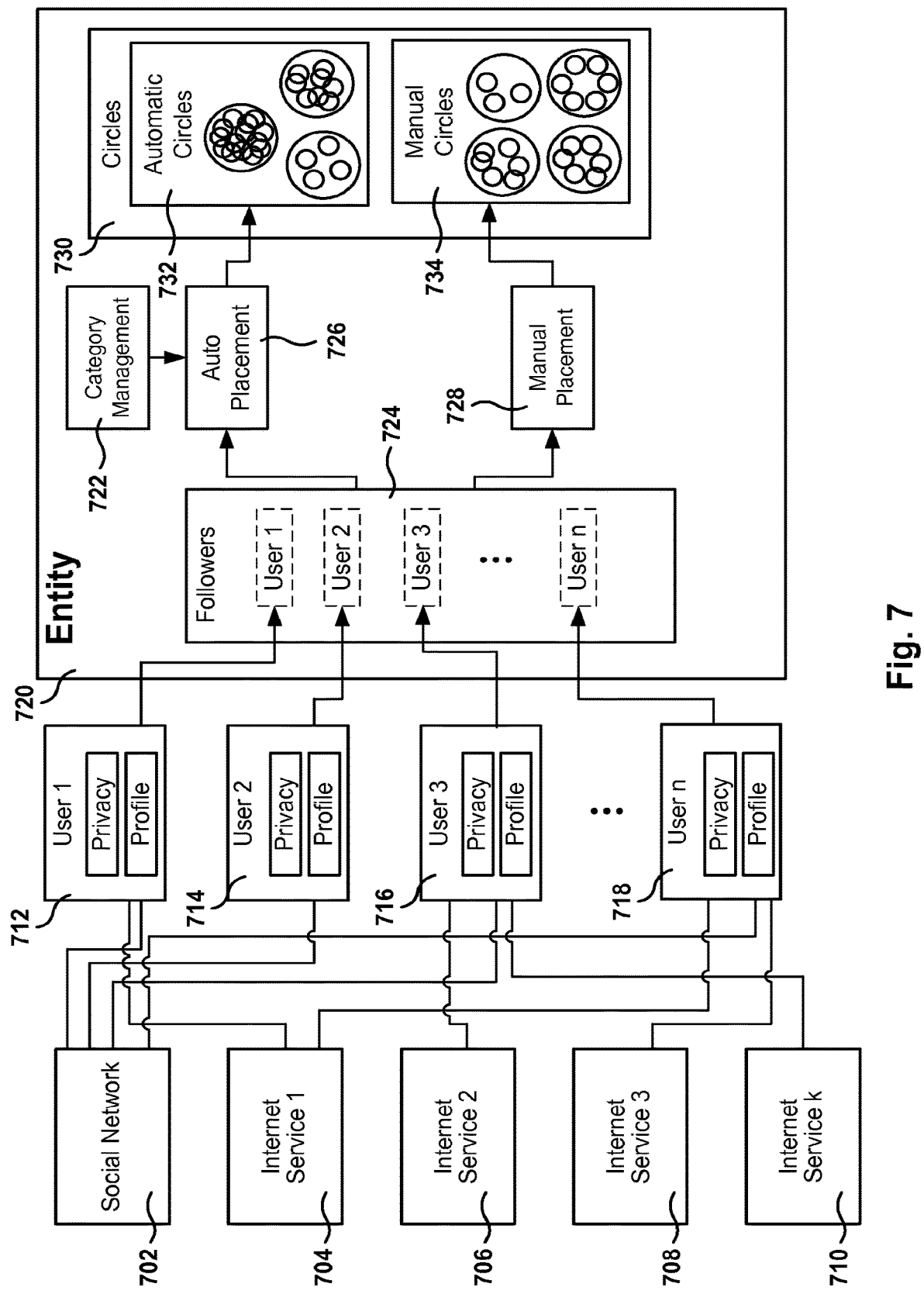
FIG. 7 provides one example architecture for the creation of groups, according to one embodiment.

FIG. 7 provides a sample architecture for the creation of groups, according to one embodiment. A plurality of users 1-n (712, 714, 716, and 718) are following entity 720. Each user has a profile and a privacy policy. As discussed above, the profile includes one or more attributes entered by the user and that define the user. The privacy policy determines how each of the attributes is shared with other users of the social network.

The attributes in the profile for each user may be entered in the social network 702, or may be obtained by the social network from other Internet services, such as Internet services 1-k (704, 706, 708, and 710). The Internet services may include one or more of an e-mail service, a video sharing service, a photo sharing service, a news service, a dating service, a financial service, etc. Of course, to use any of the attributes provided by the user, the user must have given authorization to use these attributes.

Once the entity obtains the list of people following the entity ("Followers" 724), the entity is able to add the followers to its circles 730. In order to add people to circles, the entity 720 may add the users manually, or use an automatic process to add the users to circles.

The manual placement module 728 (such as the one shown in FIG. 5) allows the entity administrator to add users to circles (e.g., by dragging and dropping a user icon). The result is one or more manual circles 734. The auto-placement module 728 (such as the one shown in FIG. 6A) allows the users to be added by the system following rules or process defined by the social network and/or the entity. The result of the automatic placement is the automatic circles 732. Is noted that a user may belong to both an automatic circle and a manual circle. In one embodiment, a circle may be formed with a combination of manual operations and automatic operations, which are referred to as semi-automatic circles (not shown).

Figure 8:
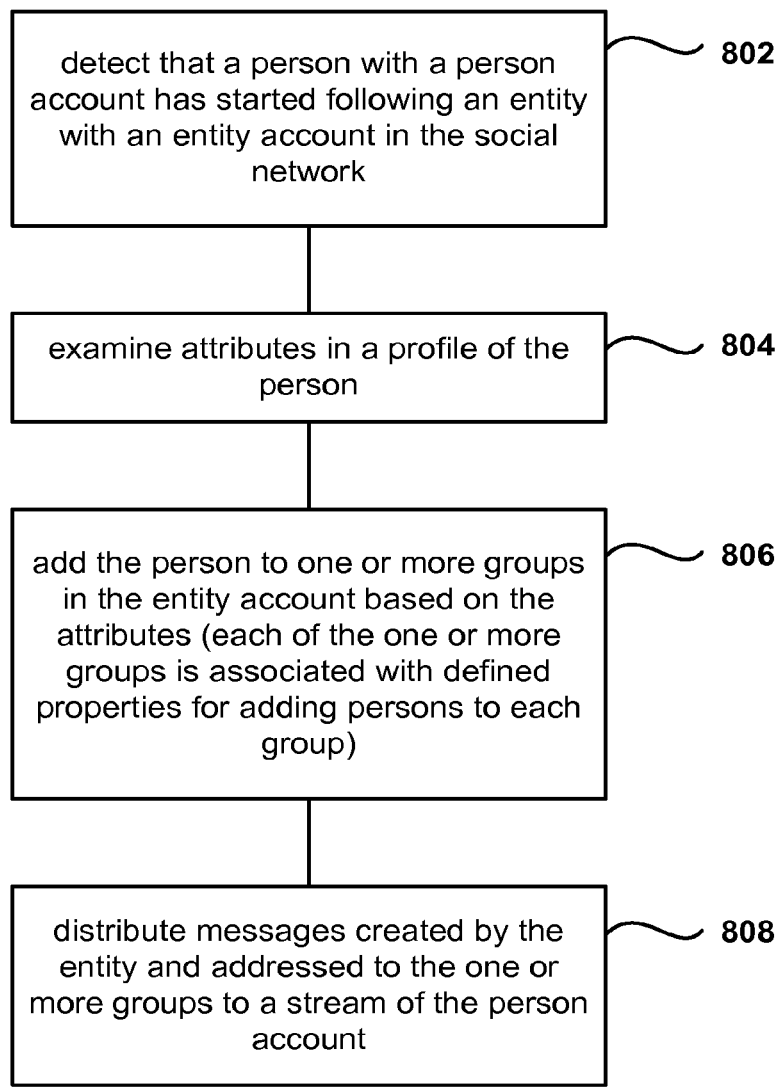
FIG. 8 shows a flowchart illustrating an process for managing communications to users of a social network, in accordance with one embodiment.

FIG. 8 shows a flowchart illustrating an process for managing electronic messages to users of a social network, in accordance with one embodiment. In operation 802, the method detects that a person with a person account has started following an entity with an entity account in the social network. After the attributes in a profile of the person are examined 804, the person is added 806 to one or more groups in the entity account based on the attributes of the person.

Each of the one or more groups is associated with defined properties for adding persons to each group. Further, in operation 808, messages created by the entity and addressed to the one or more groups are distributed to a stream of the person account. At least one operation of the method is executed through a processor.

Figure 9:
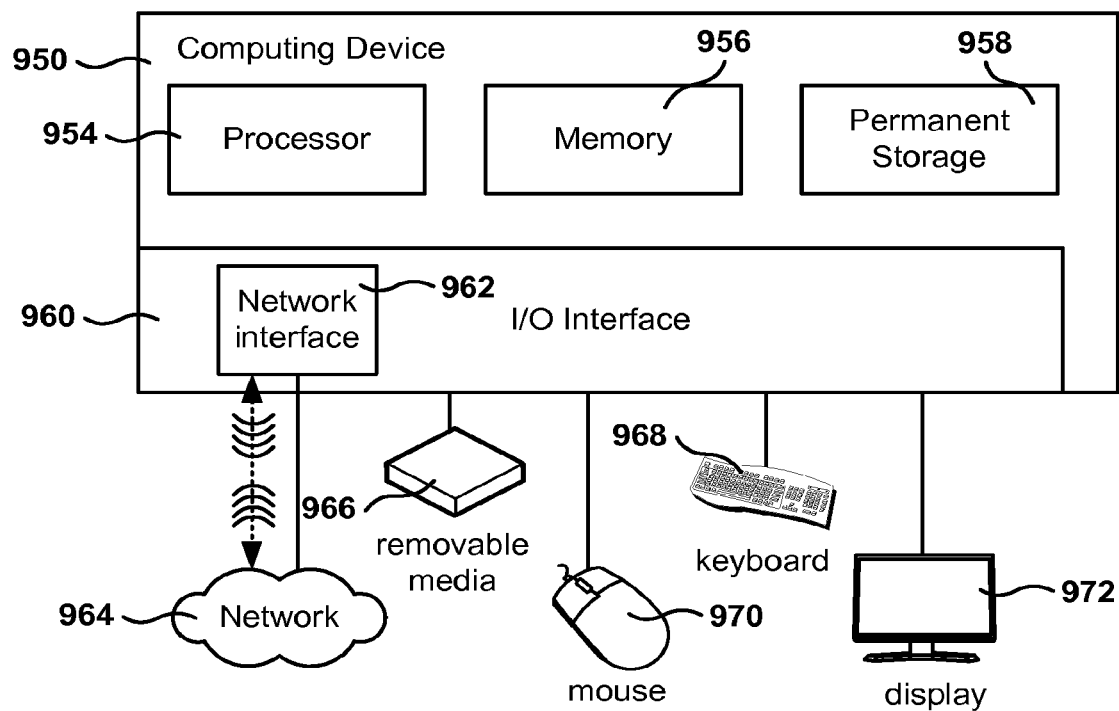
FIG. 9 is a schematic diagram of a computer system for implementing embodiments described herein.

FIG. 9 is a simplified schematic diagram of a computer system for implementing embodiments described herein. It should be appreciated that the methods described herein may be performed with a digital processing system, such as a conventional, general-purpose computer system. Special purpose computers, which are designed or programmed to perform only one function, may be used in the alternative. The computing device 950 includes a processor 954, which is coupled through a bus to memory 956, permanent storage 958, and Input/Output (I/O) interface 960.

Permanent storage 958 represents a persistent data storage device such as a hard drive or a USB drive, which may be local or remote. Network interface 962 provides connections via network 964, allowing communications (wired or wireless) with other devices. It should be appreciated that processor 954 may be embodied in a general-purpose processor, a special purpose processor, or a specially programmed logic device. Input/Output (I/O) interface 960 provides communication with different peripherals and is connected with processor 954, memory 956, and permanent storage 958, through the bus. Sample peripherals include display 972, keyboard 968, mouse 970, removable media device 966, etc.

Display 972 is configured to display the user interfaces described herein. Keyboard 968, mouse 970, removable media device 966, and other peripherals are coupled to I/O interface 960 in order to exchange information with processor 954. It should be appreciated that data to and from external devices may be communicated through I/O interface 960. Embodiments can also be practiced in distributed computing environments where tasks are performed by remote processing devices that are linked through a wired or a wireless network.

Embodiments can be fabricated as computer readable code on a non-transitory computer readable storage medium. The non-transitory computer readable storage medium holds data which can be read by a computer system. Examples of the non-transitory computer readable storage medium include permanent storage 958, network attached storage (NAS), read-only memory or random-access memory in memory module 956, Compact Discs (CD), Blu-Ray™ discs, flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor, such as processor 954 of FIG. 9. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

What is claimed is:

1. A method comprising:
automatically grouping, by a processing device, a plurality of persons that follow an entity in a social network based on characteristics of the plurality of persons to create a plurality of groups associated with an entity account of the entity;
associating, by the processing device, one or more group properties with each of the plurality of groups, wherein each of the one or more group properties specifies at least one predefined user attribute and at least one corresponding required value for the at least one predefined user attribute for adding users to one of the plurality of groups;
receiving attributes and corresponding values of a profile associated with a person account of a person of the plurality of persons in the social network, wherein the person and the entity are users of the social network, and the entity is a different type of user than the person;
in response to determining, by the processing device, that the person with the person account has started following the entity with the entity account, examining the attributes and the corresponding values of the profile associated with the person account;
adding the person to one or more groups of the plurality of groups in the entity account when at least one of the attributes and at least one of the corresponding values of the profile match with the at least one predefined user attribute and the at least one corresponding required value specified by the one or more group properties associated with the one or more groups; and
providing, by the processing device, messages addressed by the entity through the one or more groups to the person.

2. The method as recited in claim 1, wherein the attributes in the profile comprise parameters with information about the person and privacy settings for setting the parameters within the social network.

3. The method as recited in claim 2, wherein the privacy settings indicate what users of the social network are allowed to access the attributes of the profile.

4. The method as recited in claim 1, wherein adding the person to one or more groups of the plurality of groups in the entity account comprises:
providing a plurality of user properties to the entity for creating the one or more groups of the plurality of groups; and
detecting selection of one or more of the plurality of user properties to create each of the one or more groups in the entity account.

5. The method as recited in claim 1, further comprising:
detecting a creation of a manual group by the entity; and
enabling inclusion of persons in the manual group by the entity.

6. The method as recited in claim 1, wherein content of the one or more groups is disabled for inspection by the person receiving the messages.

7. The method as recited in claim 1, wherein providing messages addressed by the entity to the person comprises:
distributing the messages to persons belonging to an intersection of at least two groups of the one or more groups.

8. The method as recited in claim 1, wherein the attributes of the profile are authorized by the person for adding the person to the one or more groups.

9. The method as recited in claim 1, wherein the one or more group properties for adding persons comprise one or more of location, language, country, region, or interest.

10. A non-transitory computer readable storage medium having instructions that, when executed by a processing device, cause the processing device to perform operations comprising:
automatically grouping a plurality of persons that follow an entity in a social network based on characteristics of the plurality of persons to create a plurality of groups associated with an entity account of the entity;
associating one or more group properties with each of the plurality of groups, wherein each of the one or more group properties specifies at least one predefined user attribute and at least one corresponding required value for the at least one predefined user attribute for adding users to one of the plurality of groups;
receiving attributes and corresponding values of a profile associated with a person account of a person of the plurality of persons in the social network, wherein the person and the entity are users of the social network, and the entity is a different type of user than the person;
in response to determining that the person with the person account has started following the entity with the entity account, examine the attributes and corresponding values of the profile associated with the person account;
adding the person to one or more groups of the plurality of groups in the entity account when at least one of the attributes and at least one of the corresponding values of the profile match with the at least one predefined user attribute and the at least one corresponding required value specified by the one or more group properties associated with the one or more groups; and
providing messages addressed by the entity through the one or more groups to the person.

11. The non-transitory computer readable storage medium as recited in claim 10, wherein the attributes in the profile comprise parameters with information about the person and privacy settings for setting the parameters within the social network.

12. The non-transitory computer readable storage medium as recited in claim 11, wherein the privacy settings indicate what users of the social network are allowed to access the attributes of the profile.

13. The non-transitory computer readable storage medium as recited in claim 10, wherein adding the person to one or more groups of the plurality of groups in the entity account comprises:
providing a plurality of user properties to the entity for creating the one or more groups of the plurality of groups; and
detecting selection of one or more of the plurality of user properties to create each of the one or more groups in the entity account.

14. The non-transitory computer readable storage medium as recited in claim 10, wherein the attributes of the profile are authorized by the person for adding the person to the one or more groups.

15. The non-transitory computer readable storage medium as recited in claim 10, wherein the one or more group properties for adding persons comprise one or more of location, language, country, region, or interest.

16. A system comprising:
a memory; and
a processing device, coupled to the memory, to:
  automatically group a plurality of persons that follow an entity in a social network based on characteristics of the plurality of persons to create a plurality of groups associated with an entity account of the entity;
  associate one or more group properties with each of the plurality of groups, wherein each of the one or more group properties specifies at least one predefined user attribute and at least one corresponding required value for the at least one predefined user attribute for adding users to one of the plurality of groups;
  receive attributes and corresponding values of a profile associated with a person account of a person of the plurality of persons in the social network, wherein the person and the entity are users of the social network, and the entity is a different type of user than the person;
  in response to determining that the person with the person account has started following the entity with the entity account, examine the attributes and corresponding values of the profile associated with the person account;
  add the person to one or more groups of the plurality of groups in the entity account based on the examination of the attributes and at least one of the corresponding values of the profile match with the at least one predefined user attribute and the at least one corresponding required value specified by the one or more group properties associated with the one or more groups; and
  provide messages addressed by the entity through the one or more groups to the person.

17. The system as recited in claim 16, wherein the attributes in the profile comprise parameters with information about the person and privacy settings for setting the parameters within the social network.

18. The system as recited in claim 17, wherein the privacy settings indicate what users of the social network are allowed to access the attributes of the profile.

19. The system as recited in claim 16, wherein content of the one or more groups is disabled for inspection by the person receiving the messages.

* * * * *